JAMES A. PARK, OF LANSING, MICHIGAN, ASSIGNOR TO HIMSELF AND WILLIAM WOODHOUSE, OF SAME PLACE.

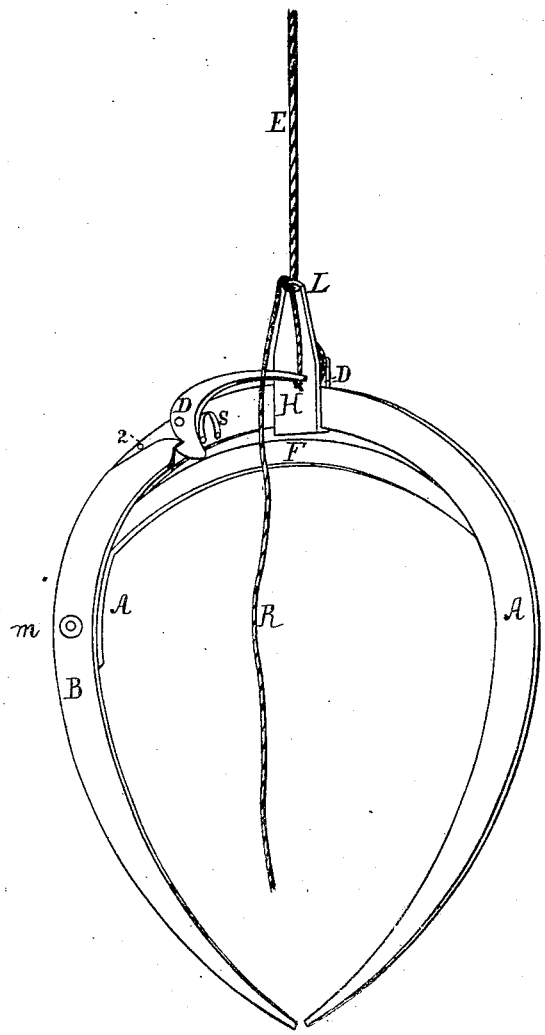

Letters Patent No. 88,804, dated April 13, 1869.

IMPROVEMENT IN HORSE HAY-FORKS.

The Schedule referred to in these Letters Patent and making part of the same.

*To all whom it may concern:*

Be it known that I, JAMES A. PARK, of the city of Lansing, county of Ingham, State of Michigan, have invented a new and useful Improvement in Horse Hay-Forks; and I do hereby declare that the following is a full, clear, and exact description thereof, reference being had to the accompanying perspective drawing of my invention, and the letters of reference marked thereon.

The fork consists of two prongs, of unequal lengths.

The long prong, A, is provided with a rivet-hole in its larger end. The outer edge of the prong A describes a semicircle from the rivet-hole to a point diametrically opposite, and continues the arc of a circle, having the rivet-hole as its centre.

The short prong is loosely riveted to the long prong, and, when the fork is closed, the two prongs meet at their points. The short prong, B, may be curved or straight from the rivet-hole to the point. The drawing exhibits the short prong describing the arc of a circle, having its centre where the prongs meet at their points, in a spot diametrically opposite the place they are riveted or bolted together.

The short prong does not have the rivet-hole near its end opposite from the point, like the long prong, but the prong extends from the rivet-hole, and engages with a catch, D, loosely secured to the long prong.

A stop on the long prong, A, at 2, prevents the ends of the prongs sliding by each other.

The catch D has a lever, $x$, and may or may not have a spring, $s$.

A dumping-rope, R, attached to the end of the lever of the catch, passes through a loop-hole, L, formed in an ear bent at right angles to an iron strap, H, fastened on or forming a part of the prong A, and having an opening, O, to receive the hoisting-rope E where it is fastened to the fork at a point opposite to the meeting-point of the prongs.

The long prong may be thickened by an extra strap of iron, bolted or welded on it, or may be braced by an iron strap, F.

The prong B, being disengaged with the catch D, swings loosely on the rivet, or bolt $m$, and opens wide enough to allow it to be pushed into the hay or straw to be raised perpendicularly, the long prong serving as the handle.

After the short prong is inserted, the long one, following in the arc of a circle, having its centre at its point, is easily pushed in until the points meet down in the hay; and, the two prongs being locked together by the catch D, a considerable bulk of hay is surrounded by them, the consequence being the elevation of large forkfuls to any desired spot with the ordinary facilities for raising; and, when up, ready to be deposited, a pull on the dumping-rope disengages the catch D from the prong B, and the hay falls with the spreading of the prongs.

Having described my invention,

I claim as new, and desire to secure by Letters Patent—

1. The piece H, having hole L, and an opening in which the elevating-rope is secured, substantially as and for the purpose herein specified.

2. The prong B, in combination with the prong A, when the latter has secured thereto the parts D and 2 and the piece H, so as to be centrally attached to the top of the fork, all made to operate substantially as and for the purpose set forth.

JAMES A. PARK.

Witnesses:
JOHN B. PARK,
L. K. HEWETT.